Figure 1:
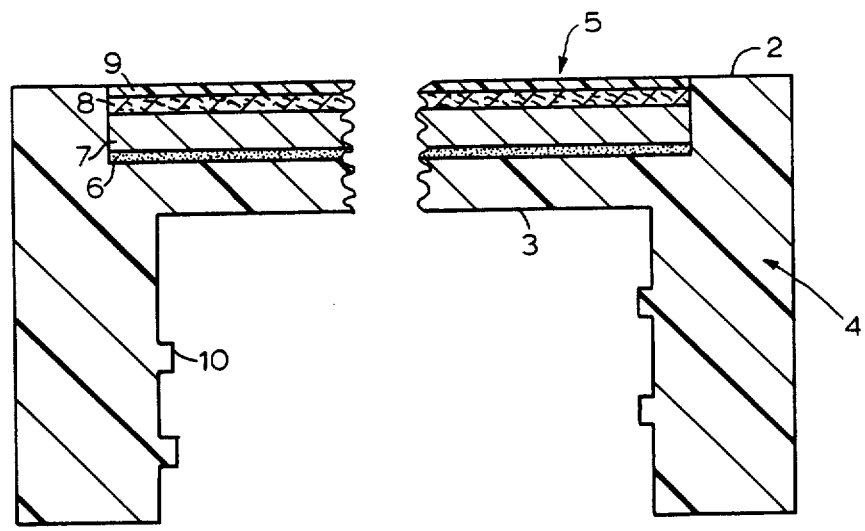

United States Patent [19]

Rossi-Mossuti

[11] Patent Number: 4,756,437

[45] Date of Patent: Jul. 12, 1988

[54] CLOSURE CAP WITH VAPOR IMPERMEABLE LAMINA

[75] Inventor: Massimo Rossi-Mossuti, Lutry, Switzerland

[73] Assignee: W. R. Grace & Co., Lexington, Mass.

[21] Appl. No.: 19,104

[22] Filed: Feb. 26, 1987

[30] Foreign Application Priority Data

Feb. 27, 1986 [GB] United Kingdom ............... 8604881

[51] Int. Cl.[4] .......................................... B65D 41/02
[52] U.S. Cl. ...................................... 215/230; 215/316
[58] Field of Search ............... 215/316, 341, 230, 365, 215/350, 366

[56] References Cited

U.S. PATENT DOCUMENTS

| | | | |
|---|---|---|---|
| 2,072,536 | 3/1937 | Trickey et al. | 264/266 X |
| 3,270,101 | 8/1966 | Jardine et al. | 264/247 X |
| 3,960,288 | 6/1976 | Phillips | 215/329 |
| 4,096,946 | 6/1978 | Cook et al. | 206/484.2 |
| 4,126,727 | 11/1978 | Kaminski | 428/172 |
| 4,151,924 | 5/1979 | Jameson | 215/347 |
| 4,370,368 | 1/1983 | Hirata et al. | 428/35 |
| 4,379,117 | 4/1983 | Baird, Jr. et al. | 264/514 |
| 4,640,428 | 2/1987 | Chang | 215/351 X |

FOREIGN PATENT DOCUMENTS

| | | | |
|---|---|---|---|
| 952674 | 8/1974 | Canada | 264/247 |
| 0117500 | 9/1984 | European Pat. Off. | |
| 1532473 | 7/1969 | Fed. Rep. of Germany | |
| 939814 | 5/1948 | France | |
| 1107608 | 1/1956 | France | |
| 2128995 | 10/1972 | France | |
| 2445474 | 7/1980 | France | |
| 056835 | 12/1978 | Japan | |
| 056862 | 11/1979 | Japan | |
| 041856 | 9/1983 | Japan | |
| 2051660 | 1/1981 | United Kingdom | |
| 2108892B | 7/1982 | United Kingdom | |

*Primary Examiner*—Donald F. Norton
*Attorney, Agent, or Firm*—John Dana Hubbard; William L. Baker

[57] ABSTRACT

Caps consisting of a closure panel and a cylindrical side wall that are relatively permeable to water vapor and/or oxygen are rendered less permeable by moulding into and permanently bonding to the inner face or, more usually, the outer face of the closure panel a relatively vapor impermeable lamina. The cap is made by a process in which a lamina is inserted into the cavity of a mould, usually an injection mould, and then the material for forming the cap is introduced into and mould in the cavity.

3 Claims, 1 Drawing Sheet

CLOSURE CAP WITH VAPOR IMPERMEABLE LAMINA

Containers such as jars and bottles for containing foodstuffs have, in the past, often been provided with metal caps of various types, such as screw caps, lug caps or crimp - on caps. Such caps are impermeable to oxygen, water vapour and other small molecules, and thus provide a good barrier between the foodstuffs and the atmosphere. This prevents ingress of oxygen and/or water vapour to protect the ingredients from becoming spoiled and egress of aromas from the foodstuffs, both of which otherwise lead to rapid deterioration of many foodstuffs. Metal caps are however being replaced by plastic caps which are aesthetically more appealing, inert to attack from ingredients in the foodstuffs and easier to provide with a tamper-evident feature.

Plastic caps may be formed from any suitable material generally polyethylene, polypropylene, ethylene-propylene copolymer or polystyrene or mixtures of these. However these plastics are permeable to oxygen and, to some extent, water vapour. In the absence of an impermeable seal, the shelf life of the product before opening and after opening could be seriously reduced.

It is known to provide containers having plastic caps with inserts comprising a laminate including an oxygen and/or water-vapour impermeable layer, such as a layer of aluminium foil. However, such inserts can become damaged during use and it is found that the seal between the top of the jar and the insert is unsatisfactory and cannot provide the desired long shelf life. To remedy this defect, there has been developed a closure system having independant primary and secondary seals. The primary seal seals the container during storage and usually comprises a sheet of aluminium foil or other impermeable material stretched across the top of the container and sealed by an adhesive. The primary seal is broken when the container is first used by the consumer and cannot be reformed thereafter. The secondary seal after opening is provided by a laminated insert. The system of seals is generally provided by forming a laminate including the insert and the primary seal material, connected together by a weak adhesive, and then adhering the whole laminate to the top of the container after applying the cap. On opening the container for the first time the weak adhesive attachment between the primary seal material and the insert is ruptured. The system is complicated to manufacture and provides an unsatisfactory secondary seal, since the seal between the insert and the top of the container is very poor since, for instance, the jar often has small amount of adhesive and primary seal material adhered to it so that it is not smooth.

In DE1532473 bottle stoppers made of low density polyethylene may have a sheet of metal foil or other impermeable sheet material adhered to the inside or outside surfaces. There is no description of how the caps are manufactured. A problem with labels or other sheet materials adhered to the outside of stoppers and caps is that the labels can easily be damaged or peeled off during manufacture, storage or use. Adhering labels requires extra work stations in the cap manufacturing line for application of the labels after the moulding operation. The extra stages can be complicated especially where the label or sheet material is to be applied to inside surfaces of caps.

In FR2128995 relatively permeable caps are rendered less permeable by incorporating a layer of impermeable material into the closure panel of the cap sandwiched between two layers of the permeable cap material. The impermeable layer may comprise polyvinylidene chloride or metal. Since the impermeable layer is covered by a layer of cap material and if this material is opaque then the impermeable layer is not visible and cannot be used as a label to carry decoration or information. The choice of cap material is therefore limited. There is no practical method of making the caps described. Thus if the cap is to be made from a preformed laminate with the layer or impermeable material in the closure panel, the cap must be made from separate parts forming the wall and the closure panel which is a complicated process, or the entire cap must be shaped from a flat laminate whilst aligning the areas of the laminate having a disc of intermediate impermeable layer with the machinery to form the closure panel which is again extremely difficult to achieve. It is stated that the permeable plastics material could alternatively be injected around the impermeable layer but it is not clear how this is done; in particular it would be difficult or impossible to support a disc of the impermeable layer in a mould cavity whilst injecting impermeable material across both faces.

In GB2108892 a liner is moulded into the inside of a preformed cap by depositing a quantity of plastics material into the cap and compression moulding the material. The liner is not permanently bonded to the cap but is held in place by an internal lip around the cap wall, which requires a complex die to produce. The apparatus used requires separate mechanisms for moulding the liner and the cap body, which is complex and expensive and has a long cycle time. The use of such apparatus for inexpensive caps is uneconomic. The liner is for providing a fluid seal against the top of the container but there is no suggestion of using relatively vapour-impermeable materials in the liner to reduce the permeability of a relatively permeable cap.

In U.S. Pat. No. 4,379,117 it is suggested that a sheet of polyvinylidene chloride is used as a liner for a crown cap i.e, a metal cap, but there is no suggestion that it could be used to render impermeable an otherwise permeable cap.

The manufacture and insertion of cap liners is expensive since they require a relatively thick layer of material and the formation and insertion of a liner is complicated.

In EP 0117500 it is proposed to provide a foil insert in a cap that has a particular shape such that there is a free air space between the foil and the inner surface of the panel of the cap. The foil can be a laminate of a polyethylene or polypropylene layer, an aluminium layer and a polyester layer.

In FR1107608 a reusable snap-off cap for reclosing bottles originally sealed with corks or crown caps may have a recess in the outer face of its closure panel in which may be received a label held by a transparent plaque clipped into the recess. There is no suggestion that the label or the plaque should be vapour impermeable. There is no specific description of the manufacture of the cap. The caps are presumably made by preforming the body having a recess, inserting a label into the recess and then clipping a preformed plaque into the recess. Caps of this type and manufacturing processes required to make them would be unsuitable for mass production as they are complex and expensive.

It is also conventional practice to provide labels on bottles and other containers. The labels may be stuck to the outer wall of the container or they may be moulded into the container wall by an in-mould labelling technique during the blow-moulding process for making the container. Thus a paper label is inserted into the mould during the blow moulding cycle so that the label becomes part of the bottle wall and is flush with the surface.

It would be desirable to be able to provide a vapour impermeable sealing system for a container involving a cap that is formed from vapour permeable polymeric material and which is easy to manufacture and thus avoids the need to provide primary and secondary seals and avoids the need to provide inserts or labels simply adhered to the other surfaces of caps, both of which can become damaged or ineffective during use. In particular it would be desirable to be able to make such a cap by a simple and single manufacturing operation.

According to the invention a container cap comprises a closure panel having inner and outer faces and side walls depending from around the inner face for fitting around the container, and the cap is moulded of vapour permeable polymeric material and has a vapour impermeable lamina permanently bonded and moulded into at least one face of the panel and extending over at least half of the surface area of the panel.

Thus in the invention the cap is rendered substantially impermeable by the provision of a permanently adhering lamina. It is naturally desirable that the lamina should extend over substantially the entire area of the panel, so as to reduce permeability as much as possible, but useful reduction in permeability will be achieved if the lamina is smaller than the panel, for instance covering three-fourths or even half the area of the panel.

It is essential in the invention that the lamina should be permanently bonded and moulded into the panel in order that there is little or no risk of it being damaged or displaced during use, and for ease of manufacture and for the aesthetically pleasing effects that can thereby be achieved.

The lamina can be moulded into the inner face of the panel but preferably is moulded into the outer face, in which event it can carry printed decoration or information. If the lamina is moulded into the outer face, it may be convenient for it to be covered by a protective layer; e.g. of a lacquer or other transparent coating.

The invention further comprises a process for moulding a container cap, which comprises a closure panel having inner and outer faces and side walls depending from around the inner face of the closure panel, from a vapour permeable polymeric material by shaping the material in the cavity of a mould and then removing it from the mould, characterised in that a vapour-impermeable lamina is inserted into the cavity prior to the introduction of the vapour permeable polymeric material and is held against the wall of the cavity corresponding to a face of the closure panel, the vapour permeable polymeric material is then introduced to the cavity and is shaped so that the lamina becomes moulded into and permanently bonded to the face of the closure panel.

The process may be a compression moulding process in which case the lamina is held against the wall of one part of the die in the cavity and the polymeric material is compressed against the lamina in the cavity by the other part of the die during shaping.

The preferred process is an injection moulding process, in which the lamina is held within the cavity of the mould and then the polymeric material is injected in the normal way.

The lamina is formed outside of the mould and the preformed lamina is inserted into the mould before introduction of the plastics material of the cap. Conveniently the lamina is cut to the desired shape from sheet material, which may previously have been printed with a decorative design or with information.

In the preferred injection moulding process a preformed lamina is inserted into the cavity (or cavities, in the case of a multi-cavity die) and polymer is injected into the cavity in the normal way.

Before introduction of polymer the lamina is held in position in the cavity by some means, generally by providing a vacuum between the lamina and the cavity. This may be achieved by providing one or more small vacuum ports, attached to a vacuum pump, in the region of the cavity where the lamina is to be held. It is generally found to be easier to provide the outer face rather than the inner face of a closure panel of moulded cap with an in-mould lamina since it is simpler to insert and hold the lamina in the cavity in such a position.

By the invention it is therefore possible to form from a vapour permeable polymeric material, in a single moulding operation, a cap of greatly reduced permeability and that carries visible decoration or information on the outer face of the panel.

The caps of the invention may, apart from the incorporation of the lamina be conventional. Thus they are made from conventional materials and are of a conventional design. Preferably they are made by injection moulding of a thermoplastic polymer. They may be provided with tamper-evident seals. Some plastic caps have an integral seal on the inner surface of the closure panel formed during the injection moulding process. Such caps may be provided additionally with a gasket, but in instances where a good seal is not required, it is satisfactory for the caps to lack a gasket. Caps without an integral seal are preferably provided with a gasket to give a good seal. Gaskets may be of conventional foamed or unfoamed types based on viscoelastic, preferably elastomeric polymers. The gaskets may be relatively impermeable to reduce the permeability of the cap. Container caps generally have substantially circular closure panels and so it is most convenient for the lamina to be a disc.

The vapour permeable polymeric material of which the cap is formed may be any of the materials conventionally used for forming plastic caps, especially polyethylene, polypropylene, ethylene propylene copolymers, polystyrene or suitable blends of these. The resultant cap is sufficiently permeable to oxygen and/or water vapour that, without modification, it would be unsuitable for sealing a container filled with contents that must be protected from the atmosphere.

The impermeable lamina can take many forms. It may be made from one material only or may consist of laminations of different materials having different functions. However it is essential that it contains at least one material which is a barrier layer formed of a material that is less permeable than the material of the remainder of the cap.

The barrier layer is preferably formed of aluminium foil or polyvinylidene chloride film but other suitable materials known to be good barriers to oxygen and/or water vapour may be used. Suitable polymers generally have halogen and/or hydroxy groups in the molecules and in addition to polyvinylidene chloride include homopolymers and copolymers of vinylidene chloride, vinyl chloride, vinyl alcohol and acrylates.

If the barrier layer is a polymeric material such as polyvinyl alcohol or polyvinylidene chloride the thickness may be from 1 to 20 μm, generally 1 to 10 μm and preferably 1 to 5 μm. If the barrier layer is of aluminium foil, the thickness may be 5 to 100 μm, generally 5 to 50 μm, preferably 8 to 24 μm. If a metalised plastic film is used as the barrier layer, the thickness of the thin layer of aluminium deposited on the plastic film may be from 1 to 20 μm, generally 1 to 10 μm, and preferably 1 to 5 μm.

In addition to the barrier layer the impermeable lamina may comprise other materials laminated together with the barrier layer. There may be one or more adhesion layers to adhere the laminations to each other or to improve the adhesion of the lamina to the panel of the cap. A suitable adhesion layer for improving adhesion to the closure panel is formed as a heat sensitive coating on the surface of the lamina, the coating being activated on contact with the plastics material during moulding to form the cap when the plastics material is at an elevated temperature.

For instance when the cap is made from polypropylene the adhesion layer to improve the adhesion of the lamina to the panel of the cap will preferably be a thin film of polypropylene. Other suitable adhesion layers that may be used depending on the material of the cap include polyethylene, oxidised polyethylene, carboxylated polyethylene, polyesters, such as polyethylene terephthalate, and polyamides. The thickness of an adhesion layer may be from 1 to 50 μm, generally 10 to 40 μm and preferably 15 to 25 μm.

The adhesive layer(s) to bond the laminations together may be conventional adhesives for the particular laminates, such as polyurethanes or may be a layer of a thermoplastic material, such as polyethylene.

If the adhesive layer comprises an adhesive such as a polyurethane the thickness may be from 1 to 50 μm, generally 1 to 20 μm and preferably 1 to 10 μm. If it comprises a thermoplastic such as polyethylene, the thickness may be from 1 to 50 μm, generally 10 to 40 μm and preferably 15 to 25 μm. Depending on the nature of the laminates and their method of production it may not be necessary to provide any adhesive layer to bond them together.

One of the layers may be printed or decorated. This may be the barrier layer itself, one of the other layers, or a separate printing layer may be incorporated, such as paper. Such paper may have a thickness in the range 12 to 100 μm.

An outer protective layer may also be provided on either or both surfaces of the lamina to protect the underlying surface from damage. Suitable materials for a protective layer are polypropylene, polyethylene, polyesters and polyamides. The thickness of this protective layer may be from 5 to 100 μm, generally 5 to 50 μm and preferably 10 to 30 μm. The layer may be part of the lamina inserted into the mould or may be applied to the cap having the lamina moulded into the closure panel. For example the caps may be coated with a liquid, for instance a laquer, after the moulding operation.

The sheet material from which the lamina is taken may be made by conventional methods for instance adhesion lamination, extrusion lamination or coextrusion. When the lamina is to be printed the layer to be printed may be printed before being laminated to other layers or the preformed laminate may be printed in roll stock form or the cut laminas may be cut individually. A protective layer may be applied after the printing and before or after lamination of the layers, as desired.

The invention is illustrated in the accompanying drawings shown in cross section (not to scale) through a cap according to the invention. The cap consists of a panel 1 having an outer face 2 and an inner face 3 and a cylindrical side wall 4 depending from around the inner face. The illustrated cap is shown as having a helical thread 10 for fastening to the neck of the container (not shown) but the cap may alternatively be provided with other fastening means as, for instance, a lug cap or a crimp-on cap.

Figure 2:
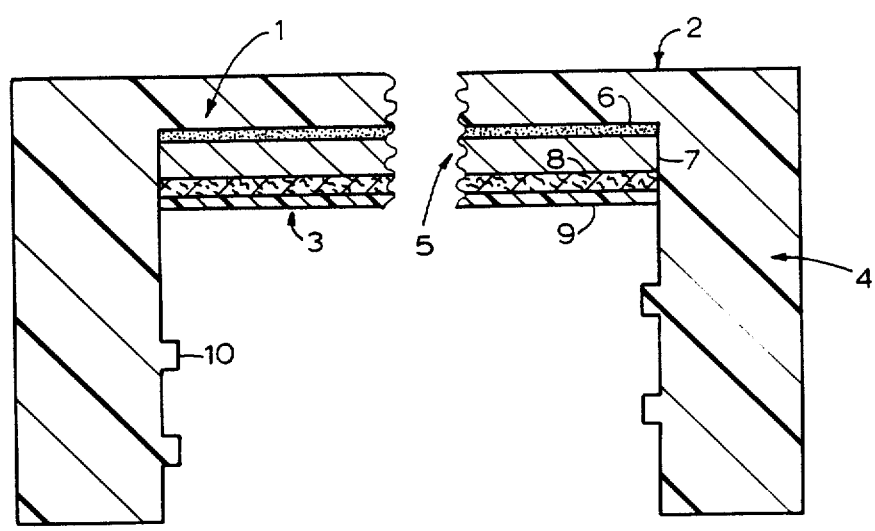

FIGS. 1 and 2 show the vapour impermeable disc 5 moulded into either the outer face (FIG. 1) or inner face (FIG. 2) of the closure.

This disc is formed of a laminate consisting of an adhesion layer 6, a barrier layer 7, a printed paper layer 8 and a protective layer 9.

The following are some examples of suitable laminae.

EXAMPLE 1

A plain 15 microns thick aluminium foil is printed with the decoration and then coated with a conventional protective lacquer. One example of a lamina has no adhesion layer. A preferred lamina is provided with an adhesion layer on the opposite side of the printing to improve adhesion to the cap. A sheet material for use to mate a lamina suitable for bonding to a poly-propylene cap has a first polyethylene adhesive layer 15 microns thick bonded to the alumimum and a second overlaying adhesion layer of polypropylene 20 microns thick. A disc of the sheet material is cut to form a lamina and is inserted into the cavity of a conventional die of an injection mould for a cap and is held in position on the wall of the cavity corresponding to the outer face of the closure panel, by vacuum ports. Polypropylene is injected into the cavity to form the cap in the normal way.

EXAMPLE 2

The barrier lamina is in the form of a metalised polyester film, comprising polyethylene terephthalate film 70 microns thick covered on one surface with a thin film (5 microns) of aluminium. The aluminium surface may be decorated as in Example 1. The other surface, that is the polyester, is bonded to a polypropylene adhesion layer by means of a polyethylene layer as in Example 1. The lamina is moulded into a cap by the injection moulding process used in Example 1.

EXAMPLE 3

The barrier layer is a polyvinylidene chloride (PVDC) extrusion laminated on to a film of polyethylene terephthalate. The PVDC layer is printed and then bonded by means of extrusion lamination to layers of polyethylene and polypropylene which form the adhesive layers. The laminate formed comprises:

(i) Outer protective layer of polyester 15 microns thick;
(ii) Barrier layer of PVDC printed on the inner surface 5 microns thick;
(iii) Polyethylene adhesive layer 15 microns thick to form a bond between the PVDC and the polypropylene;

(iv) An adhesion layer of polypropylene 15 microns thick to provide adhesion to the polypropylene cap material.

The cap is formed by the injection moulding process used in Example 1.

EXAMPLE 4

This is similar to Example 3 above except the polyester/PVDC laminate is bonded to the polypropylene layer by adhesion lamination using a polyurethane adhesive layer applied at a thickness of 4 microns. The cap is moulded from polypropylene by injection moulding by the same process that is used in Example 1.

EXAMPLE 5

A further example of lamina is formed comprising the following layers:
(i) An outer protective layer of polyamide 15 microns thick,
(ii) Paper as the substrate for printing,
(iii) PVDC as the barrier layer, 4 microns thick,
(iv) Polyurethane adhesive 4 microns thick to bond the barrier layer to polypropylene,
(v) Polypropylene adhesion layer, 20 microns thick.

Further laminas were formed in which the polyamide protective layer (i) was replaced by one of polyester, polyethylene and polypropylene, each used at a thickness of 25 microns. In a further set of laminas the PVDC barrier layer (iii) was replaced by a copolymer of ethylene and vinyl alcohol. Each of the laminas was inserted into the cavity of an injection mould die and caps were made as in Example 1 by injection moulding polypropylene.

While this invention has been described with reference to its preferred embodiments, other embodiments can achieve the same result. Variations and modifications of the present invention will be obvious to those skilled in the art and is intended to cover in the appended claims all such modifications and equivalents as fall within the true spirit and scope of this invention.

What I claim:

1. A container closure comprising a closure panel having inner and outer faces and side walls depending downward from the inner face of the closure panel, the closure panel is formed of a vapour permeable polymeric material, and a vapour impermeable lamina moulded into at least one face of the closure panel, the vapour impermeable lamina having a vapour barrier layer selected from the group consisting of aluminum foil, metalized polyester film, homopolymers and copolymers of vinyl chloride, homopolymers and copolymers of vinyl alcohol and homopolymers and copolymers of vinyl acrylate; a printed layer selected from the group consisting of aluminum foil, metalized polyester film, polyvinylidene chloride and paper, and an outer protective layer selected from the group consisting of polypropylene, polyethylene, polyesters and polyamides; and wherein the vapour impermeable lamina extends over at least half of the panel's surface area.

2. A thermoplastic, vapour permeable container closure comprising a closure panel having an inner and outer face, and side walls depending downward from the inner face of the closure panel, and a vapour impermeable lamina moulded into the outer face of the closure panel, the vapour impermeable lamina consisting of a vapour barrier layer, a printed layer and an outer protective layer, wherein the vapour barrier layer is selected from the group consisting of aluminum foil, metalized polyester film, homopolymers and copolymers of vinyl chloride, homopolymers and copolymers of vinyl alcohol and homopolymers and copolymers of vinyl acrylate; the printed layer is selected from the group consisting of aluminum foil, metalized polyester film, polyvinylidene chloride and paper; and the outer protective layer is selected from the group consisting of polypropylene, polyethylene, polyesters and polyamides.

3. A thermoplastic, vapor permeable container closure comprising a closure panel having an inner and outer face and side walls depending downward from the closure panel and a vapour impermeable lamina moulded into the inner face of the closure panel, the lamina consisting of a vapour barrier layer, a printed layer and an outer protective layer, wherein the vapour barrier layer is selected from the group consisting of aluminum foil, metalized polyester film, homopolymers and copolymers of vinyl chloride, homopolymers and copolymers of vinyl alcohol and homopolymers and copolymers of vinyl acrylate; the printed layer is selected from the group consisting of aluminum foil, metalized polyester film, polyvinylidene chloride and paper; and the outer protective layer is selected from the group consisting of polypropylene, polyethylene, polyesters and polyamides.

* * * * *